C. AND M. BARUS.
APPARATUS FOR DETERMINING THE SPEED OF VEHICLES.
APPLICATION FILED AUG. 12, 1918.
1,319,036.
Patented Oct. 21, 1919.
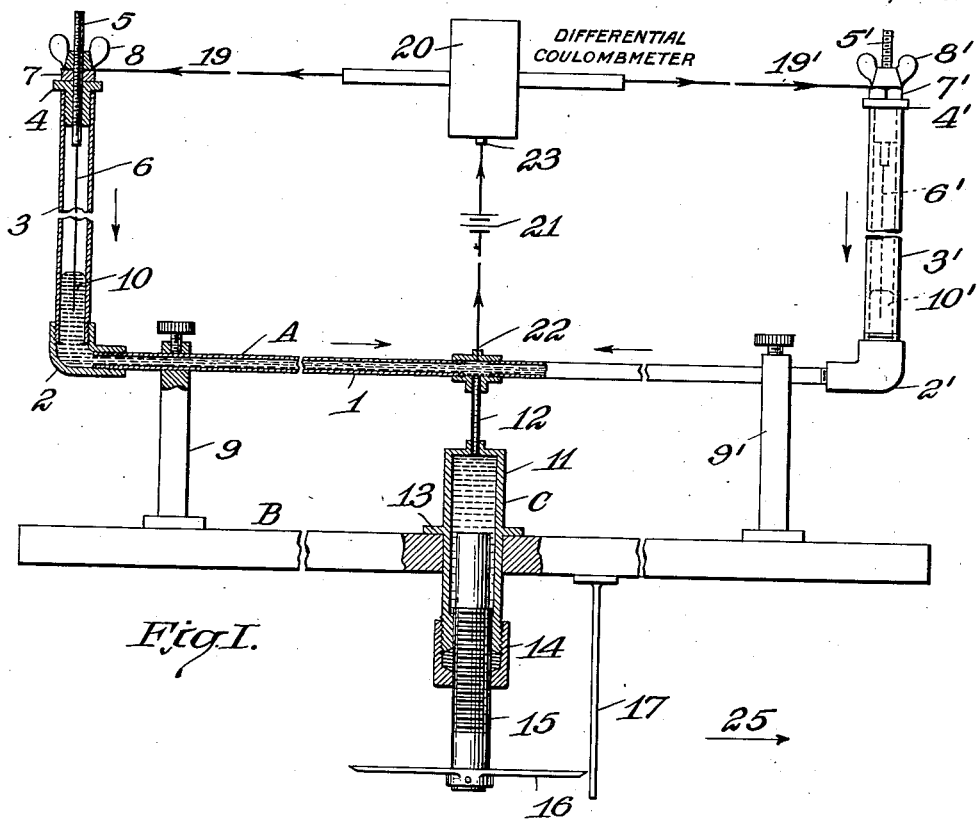
Fig. I.
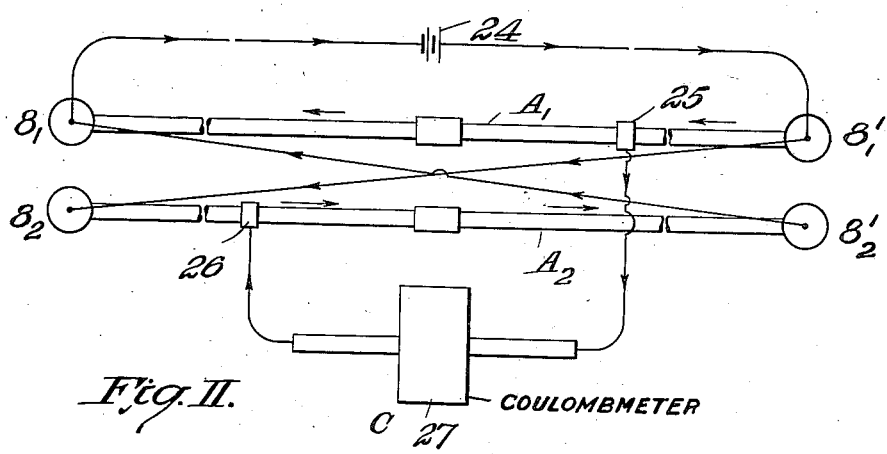
Fig. II.
Inventors
Carl Barus.
Maxwell Barus
By their Attorney
Maxwell Barus

UNITED STATES PATENT OFFICE.

CARL BARUS, OF PROVIDENCE, RHODE ISLAND, AND MAXWELL BARUS, OF NEW YORK, N. Y.

APPARATUS FOR DETERMINING THE SPEED OF VEHICLES.

1,319,036.   Specification of Letters Patent.   Patented Oct. 21, 1919.

Application filed August 12, 1918. Serial No. 249,576.

*To all whom it may concern:*

Be it known that we, CARL BARUS, a resident of Providence, in the county of Providence and State of Rhode Island, and MAXWELL BARUS, a resident of the city of New York, borough of Manhattan, county and State of New York, both citizens of the United States, have jointly invented new and useful Improvements in Apparatus for Determining the Speed of Vehicles, of which the following is a specification.

In our copending application, Serial No. 240,974, we described a method and apparatus for measuring the speed of vehicles and particularly adapted for aeroplanes or balloons, which consists in generating electric currents proportional to the accelerations experienced by the vehicle in the direction in which its speed is to be measured and integrating the currents by the aid of a coulombmeter. In said application, Serial No. 240,974, we pointed out that the integral of the currents, that is, the number of coulombs transferred, will be substantially proportional throughout all the time to the velocity of the vehicle which is the integral of the accelerations, and that therefore the coulombmeter might be standardized to indicate the speed of the vehicle. In said application we also described a type of coulombmeter especially adapted for such use, and we also pointed out that the coulombmeter might be used differentially instead of directly, in which case the integral of the difference of currents, which difference was proportional to the accelerations experienced by the vehicle, would be proportional to the speed of the vehicle.

In said application, the means described for producing the currents proportional to the speed of the vehicle comprised a Wheatstone bridge preferably having two sliding contacts controlled by a weight free to slide to and fro on tracks in response to the accelerations experienced, and the means for producing currents whose difference was proportional to the accelerations experienced consisted of a shunt having a sliding contact controlled by a weight similarly mounted.

This invention provides another means of producing electric currents substantially proportional to the acceleration experienced or electric currents whose difference is proportional to the accelerations experienced. According to this invention a liquid sliding contact is provided to operate the Wheatstone bridge or shunt. It has the advantage over the method described in that it eliminates the risk of error due to friction of the moving parts, and it may be more easily and cheaply constructed.

Referring to the drawings, Figure I is a side elevation partly in section of a form of shunt having a liquid sliding contact adapted for producing electric currents, of which the difference is proportional to the accelerations of the vehicle, and is also a side elevation of each of the two elements illustrated diagrammatically in plan in Fig. II. Fig. I also shows diagrammatically the arrangement of the electric circuit and coulombmeter for operating by the shunted circuit method. Fig. II illustrates diagrammatically in plan the electric connections for two devices such as that illustrated in Fig. I, so as to form a type of Wheatstone bridge having a double liquid sliding contact.

Referring to Fig. I, A is a U-tube having a long horizontal shaft 1, which may be advantageously made of iron or other metal not attacked by mercury or other liquid conductor, with which the tube is to be filled as hereinafter explained. At each end of the shaft 1 are elbows 2, 2', which connect with upright shanks of the U-tube 3, 3'. The shanks 3, 3' are made of suitable insulating material such as glass and are provided with caps 4, 4'. The caps are perforated to receive screws 5, 5', to the lower ends of which are soldered or otherwise suitably affixed the electrical resistance filaments 6, 6'. The screws 5 may be held in position by lock nuts 7, 7'. Wing nuts 8, 8' may be provided to form binding posts for the electrical connecting wires. The U-tube A is mounted rigidly on the bed plate B by suitable means such as the clamp posts 9, 9'. The U-tube A is mounted so that its length is in the direction relative to the vehicle in which it is desired to determine the speed, *i. e.*, usually longitudinally or transversely according as it is desired, to determine the speed of the vehicle on its course or the drift of the vehicle from its course.

The bed plate B is stabilized in a horizontal plane by any suitable known means. The particular means of stabilization form no part of this invention.

The U-tube A is filled with mercury or other suitable liquid conductor until the resistance filaments 6, 6' are immersed in the mercury for some distance when no acceleration is being experienced.

The resistance filaments 6, 6' are of the same length, material and of uniform cross-sectional area. They may be advantageously made of carbon or other suitable material, having comparatively high electrical resistance and not attacked by the mercury or the liquid conductor employed. The filaments should be thoroughly cleaned before use so as to make the best possible contact with the mercury and avoid capillary forces caused by the presence of contaminating material such as grease. The shanks 3, 3' of the U-tube are also advantageously exhausted of air, for which purpose of course the caps 4, 4' must be sealed air-tight.

When the vehicle is accelerated in the direction indicated by the arrow 25, the meniscus 10 is elevated and the meniscus 10' depressed by an amount proportional to the acceleration.

The theory of the instrument, which need not be here discussed in detail, shows that the sensitiveness of the apparatus is substantially proportional to the length of the filaments 6, 6' included between the meniscuses 10, 10' respectively, and the screws 5, 5' respectively. This distance however must be considerably greater than the variations in head of the mercury which will be caused by the accelerations, for otherwise substantial errors will arise caused by changes in the collective resistance of the branches of the shunt. It is desirable to have the instrument as sensitive as possible, but this distance must be great enough to accommodate the variations in the head of the mercury in the shanks caused by the accelerations to be integrated. Hence, in order that the instrument may be adapted to deal when necessary with accelerations of large magnitude, and made more sensitive when only accelerations of small magnitude are to be anticipated, an adjuster C may be advantageously provided. It comprises the barrel 11 made of iron or other suitable material, not attached by the mercury, or other liquid conductor employed in the U-tube A. The barrel is connected by the tube 12 with the shank 1 of the U-tube A and may be secured to the bed plate B by flanges 13, as shown in Fig. I. The barrel 11 is provided at its lower end with a stuffing box 14, through which a steel screw 15 passes without leakage. The rigid head of the screw is the disk 16, graduated at its edge so that the number of turns and fractions of a turn may be read off at a fixed pointer 17. The barrel 11 is filled with mercury as well as the shank 1 of the U-tube. The screw 15 nearly fills the barrel 11. Hence, when the screw 15 is forced in, the meniscuses at 10, 10' will rise by an equivalent amount and the sensitiveness of the apparatus be increased by an amount determinable from the reading of the pointer 17 on the graduated disk 16. Vice versa the sensitiveness of the instrument may be decreased. In this way the instrument may be adapted to accelerations of very different orders of magnitude.

To use the instrument so as to determine the speed of the vehicle according to the differential shunt method, the wires 19 connect the binding posts 8, 8' with the respective branch terminals of a differential coulombmeter 20, which may be advantageously of the type described in our copending application, Serial No. 240,974. The junction terminal 23 of the coulombmeter 20 is connected with a battery 21, which is in turn connected to a binding post 22 on the shank 1 of the U-tube A. The coulombmeter 20 and its connections are disposed at any convenient points on the base plate B of the instrument.

When the vehicle is accelerated, the difference of the currents passing through the two shanks of the U-tube A will be substantially proportional to the accelerations experienced, and the coulombmeter, as pointed out in our said prior application Serial No. 240,974, will integrate this difference and may be standardized to indicate the speed of the vehicle.

To use the apparatus so as to determine the speed of the vehicle by the double sliding contact Wheatstone bridge method, two similar U-tubes $A_1$, $A_2$ of the type just described are mounted parallel to each other on the same stabilized base plate. The binding posts $8_1$ $8'_2$ and $8_2$, $8'_1$ are cross connected as illustrated in Fig. II. The binding posts $8_1$, $8'_1$ are connected to a battery or other suitable source of constant electromotive force 24. The binding posts 25 and 26 on the shanks of the U-tube $A_1$ and $A_2$ respectively, are connected to the coulombmeter 27 which may advantageously be of the type described in our aforesaid application, Serial No. 240,974. The currents running through the coulombmeter 27 will be proportional to the accelerations experienced and will be integrated by the coulombmeter which accordingly may be standardized to indicate the speed of the vehicle.

It will be obvious from the foregoing that many changes, alterations, variations and substitutions in the parts and detail of the instrument may be made without departing from the spirit and scope of our invention.

What we claim is:

1. In apparatus for the integration of speeds from accelerations, a U-tube containing a liquid conductor filling the base shank and partly filling the upright shanks thereof, and electrical resistance elements in said shanks contacting with said liquid conductor.

2. In apparatus for the integration of speeds from accelerations, a U-tube containing a liquid conductor filling the base shank and partly filling the upright shanks thereof, electrical resistance elements in said shanks contacting with said liquid conductor, and means for varying the quantity of the liquid conductor by a known amount so as to change the sensitiveness of the instrument.

3. Apparatus for the integration of accelerations comprising a U-tube containing mercury filling the base shank and partly filling the upright shanks thereof, electric resistance elements in said upright shanks contacting with said mercury, a differential coulombmeter electrically connected with said resistance elements, and a source of constant electromotive force electrically connected with said mercury and the junction terminal of said differential coulombmeter.

4. Apparatus for the integration of accelerations comprising two similar parallel U-tubes, each containing mercury filling the base shank and partly filling the upright shanks thereof, electrical resistance elements in said upright shanks contacting with said mercury, electrical cross connections between the resistance elements of the respective U-tubes diagonally opposite to each other, a source of constant electromotive force connected to the resistance elements in one of said tubes, and a coulombmeter electrically connected to the mercury in each of said U-tubes.

CARL BARUS.
MAXWELL BARUS.